United States Patent [19]

Pereman et al.

[11] 4,278,193
[45] Jul. 14, 1981

[54] GLASS BREAKING AND SEPARATING APPARATUS AND METHOD

[75] Inventors: Gordon F. Pereman, Columbus; John D. Kellar, Pontypool, both of Canada

[73] Assignee: PPG Industries, Inc., Pittsburgh, Pa.

[21] Appl. No.: 39,219

[22] Filed: May 15, 1979

[30] Foreign Application Priority Data

Feb. 28, 1979 [CA] Canada ................................. 322445

[51] Int. Cl.³ ............................................. C03B 33/04
[52] U.S. Cl. ...................................... 225/2; 225/96.5
[58] Field of Search ........................... 225/2, 96.5, 103

[56] References Cited

U.S. PATENT DOCUMENTS

| | | | |
|---|---|---|---|
| 3,178,085 | 4/1965 | Jochim | 225/2 |
| 3,181,757 | 5/1965 | O'Dell et al. | 225/96.5 |
| 3,520,457 | 7/1970 | Augustin | 225/96.5 X |
| 3,613,974 | 10/1971 | Chatelain et al. | 225/93.5 |
| 3,743,149 | 7/1973 | Groppe | 225/2 |
| 3,883,056 | 5/1975 | Landes et al. | 225/96.5 X |
| 3,913,812 | 10/1975 | Augustin et al. | 225/96.5 X |
| 3,963,159 | 6/1976 | Krulwich | 225/96.5 |
| 4,009,813 | 3/1977 | Insolio et al. | 225/96.5 X |
| 4,113,162 | 9/1978 | Boehm et al. | 225/96.5 X |
| 4,140,258 | 2/1979 | Gray | 225/96.5 X |
| 4,151,940 | 5/1979 | Nuding et al. | 225/96.5 |
| 4,155,495 | 5/1979 | Cathers | 225/96.5 |

FOREIGN PATENT DOCUMENTS 830278 12/1969 Canada.

Primary Examiner—Frank T. Yost
Attorney, Agent, or Firm—Stevens, Davis, Miller & Mosher

[57] ABSTRACT

The invention enables the scoring and breaking out of a pair of glass blanks from a single sheet of glass in a rapid and efficient manner. Apparatus is provided which carries out a method including the steps of applying first and second score line patterns to a single piece of glass, which patterns define, at least in part, the outlines of glass blanks to be subsequently broken out from the piece of glass. Following this operation, forces are applied to the piece of glass in such a way as to sever the glass along a portion of one of the score lines and to split the piece of glass into two parts each having a respective one of the patterns thereon. The glass parts are then separated a selected distance away from one another and thereafter breakout forces are applied to the glass parts to sever such parts along their respective score line patterns.

17 Claims, 15 Drawing Figures

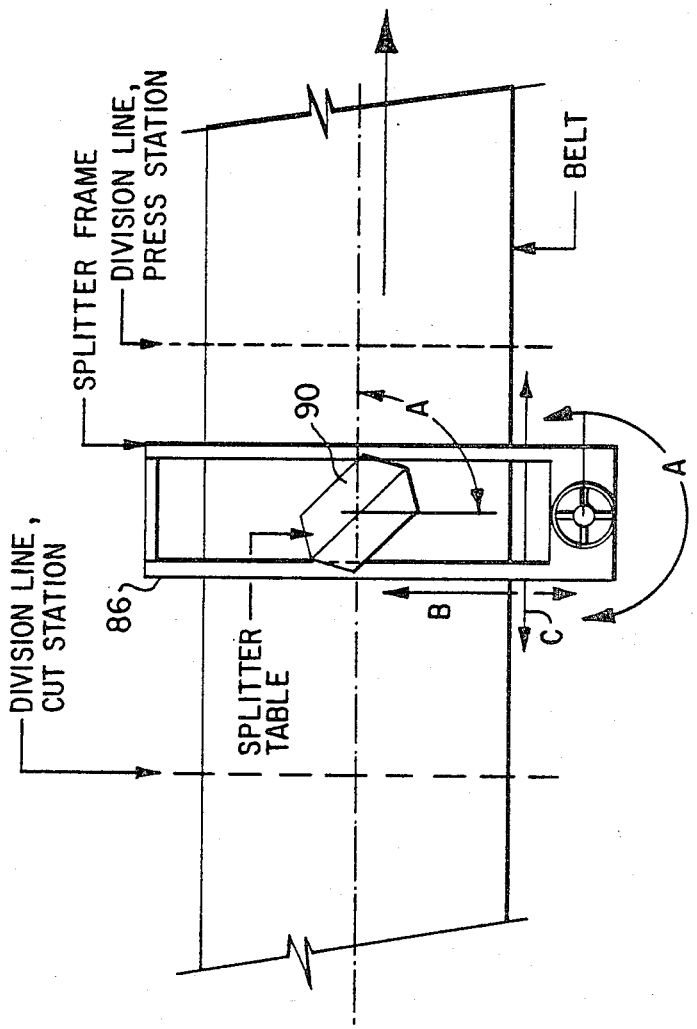

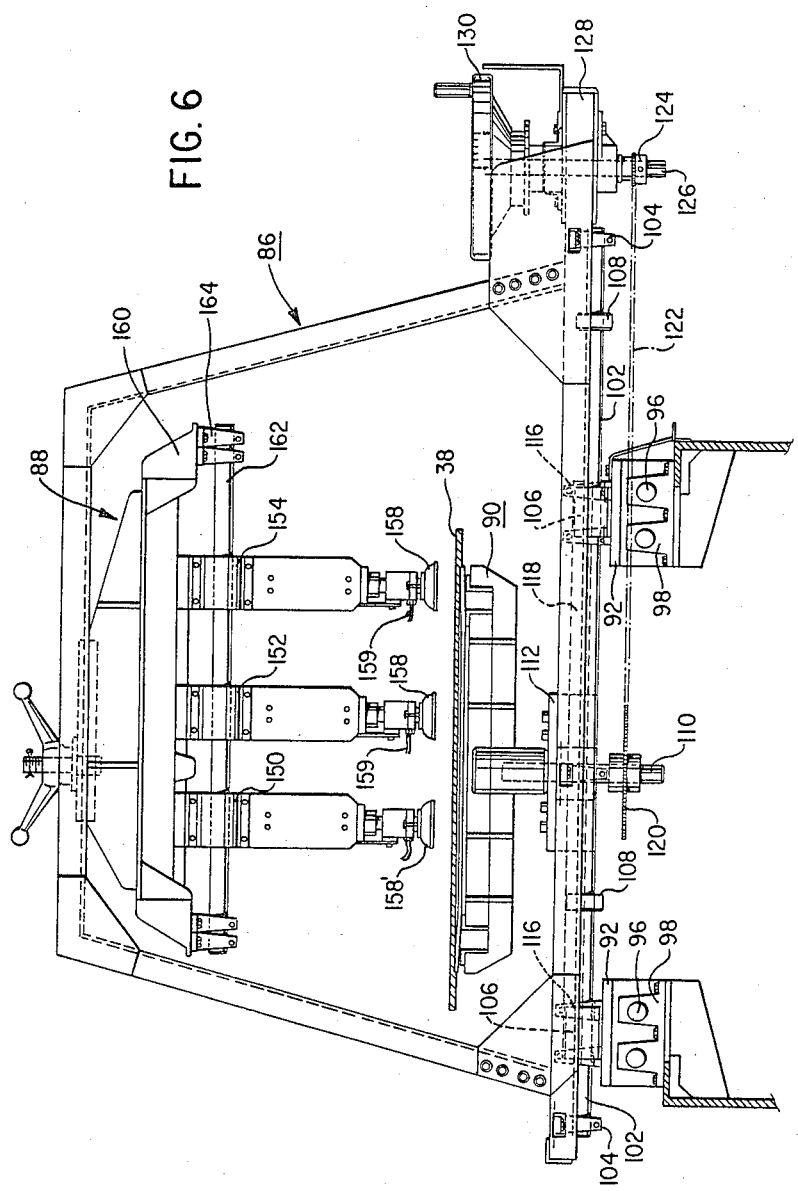

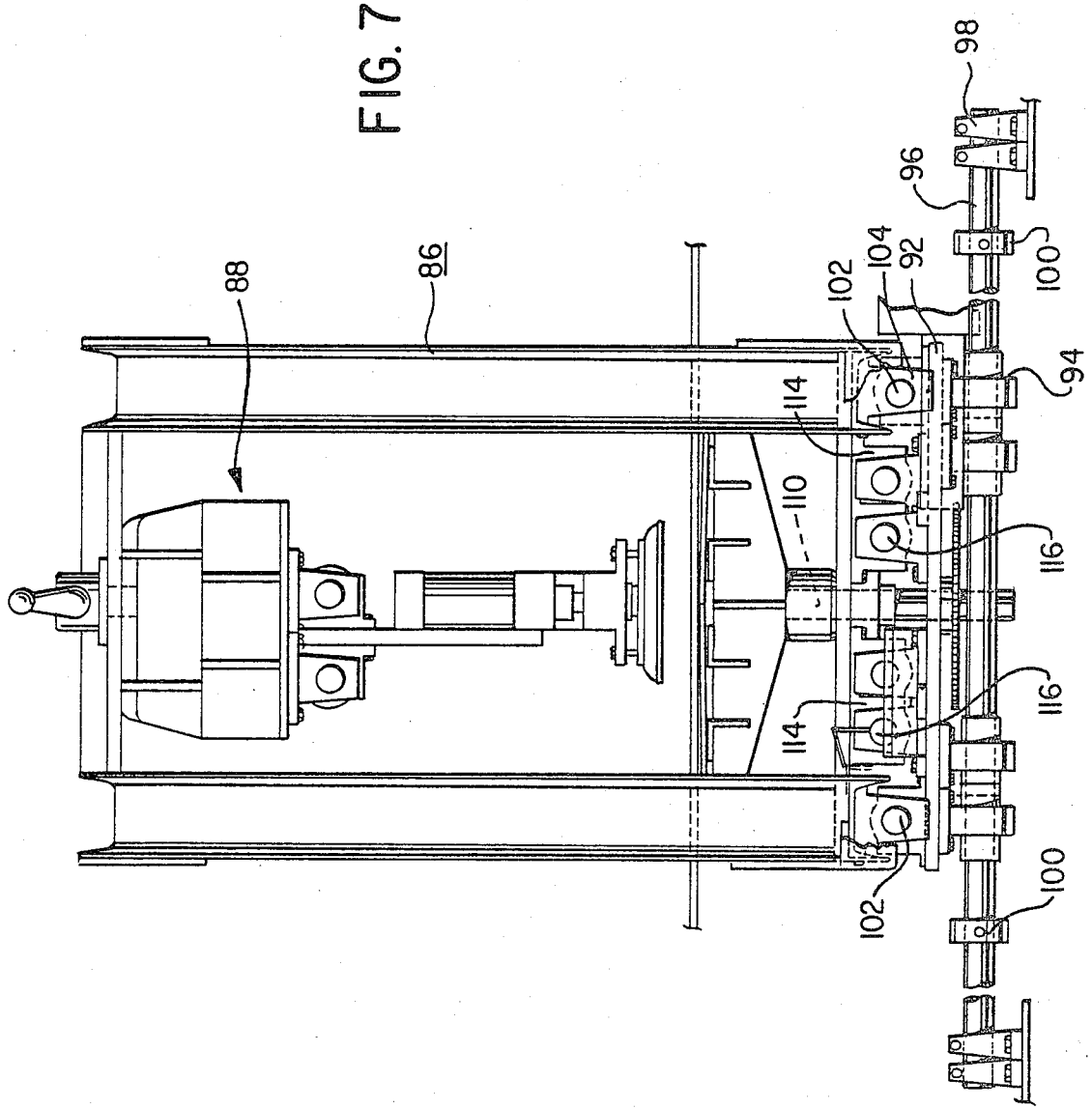

GLASS BREAKING AND SEPARATING APPARATUS AND METHOD

BACKGROUND OF THE INVENTION

This invention relates to the manufacture of glass blanks having predetermined outline shapes such as would be used, for example, in the manufacture of window assemblies for automobiles.

In the manufacture of glass shapes for automobile windows and the like it is well known to apply a score line conforming to a desired outline shape to the surface of a rectangular sheet of glass. After scoring the sheet, it is also very well known to apply forces to the sheet so as to cause the glass to break along the score line thereby to enable the marginal edges of the sheet lying outside of the score line to be separated from the remaining glass blank of desired outline contour.

For many years now the above described operations have been carried out automatically on a conveyor line. The rectangular sheets of glass are automatically positioned on the inlet end of the conveyor belt and the conveyor belt is automatically indexed to bring the sheets sequentially to a scoring station and thence to a breakout station wherein the marginal edges of the glass lying outside of the score line are broken off. The glass is then advanced to a further station where the glass blank of desired outline shape is lifted away from the waste marginal portions of the glass (known as cullet). The glass blank is then heated by passing the same through a heating furnace thereby to permit the sheet to be moulded to the desired surface contour.

When the overall configuration of the pattern is generally triangular or the like, a substantial area of glass sheet can be saved if two such patterns can be scored and broken out from a single sheet of glass. This poses no particular problem insofar as the scoring operation is concerned, i.e. two scoring devices can be positioned on the conveyor line each one being arranged to apply a respective one of the score line patterns to the single sheet of glass. The problem arises when an attempt is made to breakout the two patterns which are inscribed on the same glass sheet. It has been found that conventional presses only tend to break the glass around those portions of the score lines which are located toward the marginal edges of the glass sheet. Those portions of the score line patterns which are located toward the central areas of the glass sheet are either not broken at all or are broken in an inconsistent fashion, this problem being particularly acute when there is only a short distance separating the two score line patterns from one another.

SUMMARY OF THE INVENTION

The principal object of the present invention is to provide a method and an apparatus capable of overcoming the problem referred to above and which enables the scoring and breaking out of glass blanks of predetermined outline shape from a single glass sheet in a rapid and efficient manner.

A method of scoring and breaking out glass blanks of predetermined outline shapes from a glass sheet in accordance with one aspect of the invention includes applying first and second score line patterns to a piece of glass, the first and second score line patterns each including a respective score line segment, which score line segments extend adjacent to one another, said score line patterns defining, at least in part, the outlines of glass blanks to be subsequently broken out from the piece of glass. Following this operation, forces are applied to the piece of glass in such a way as to sever the glass along a portion of one of the score line segments and to split the piece of glass into two parts each having a respective one of the patterns thereon. The glass parts are then separated a selected distance away from one another and thereafter breakout forces are applied to the glass parts to complete the severing of such parts along their respective score line patterns.

The above noted step of splitting the piece of glass into two parts includes positioning the glass over a surface having a raised ridge with said portion of the one score line being aligned with the ridge with the above noted forces being applied to the glass on opposite sides of the ridge to create bending moments of force in the glass about said portion of the one score line to sever the glass.

The step of separating the two glass parts preferably includes lifting one of the glass parts clear of the surface on which it was resting and then shifting said one glass part laterally relative to the other before depositing the glass part on such surface thereby avoiding scuffing of the glass.

Preferably, the glass sheets are initially separated from one another by a minor amount while they are still resting on the surface prior to the lifting step thereby to prevent damage to the adjacent edges of the glass parts during the lifting step.

The above noted forces which effect splitting of the glass are preferably applied to the glass by means of vacuum pads which are initially moved downwardly into forcible engagement with the glass to effect the splitting thereof. One vacuum pad is capable of engaging a portion of the glass part to enable the same to be lifted clear of the above noted surface.

In a typical operation according to the invention, the breakout forces are effected by means of a conventional diaphragm press. Although any suitable form of press may be used, the diaphragm type of press is preferred since no adjustments need be made when changing from one glass pattern to another.

In a typical operation, all of the above noted steps are carried out automatically and at a relatively high rate of speed. The glass is typically supported on an endless conveyor belt which carries the glass in step-by-step fashion through a scoring station where the scoring operations are effected, and thence through a splitting station where the glass is split into two parts and separated from one another and thence through at least one breakout station where the breakout forces are applied. Following this the glass is carried to a further station and the glass blanks lifted clear of the conveyor belt and transported to a further processing station with the waste glass then being transported to a disposal station for processing in the usual manner.

Apparatus for scoring and breaking out glass blanks of predetermined shape from a single glass sheet in accordance with a further aspect of the invention includes means for applying first and second score line patterns to a piece of glass in such a manner that the first and second score line patterns each include a respective score line segment, which score line segments extend adjacent to one another, said score line patterns defining, at least in part, the outlines of glass blanks to be subsequently broken out from the piece of glass; means for applying forces to the piece of glass in such a way as to sever the glass along one of the score line segments and to split the piece of glass into two parts each having a respective one of said patterns thereon; means for laterally separating the two glass parts a selected distance away from one another; and means for applying breakout pressures to the separated glass parts to complete the severing of the parts along their respective score line patterns.

Further features of the apparatus will become apparent from the following description of a preferred embodiment of the invention taken in conjunction with the claims appended hereto.

BRIEF DESCRIPTION OF THE DRAWINGS

In drawings which illustrate an embodiment of the invention:

FIG. 5A is a diagrammatic plan view of the splitter station illustrating the various ways in which the splitter frame and splitter table may be positionally adjusted;

FIG. 6 is an elevation view of the splitter station taken transverse to the conveyor line;

FIG. 7 is an elevation view of the splitter station taken parallel to the conveyor line;

DETAILED DESCRIPTION OF THE PREFERRED EMBODIMENT

Figure 1:
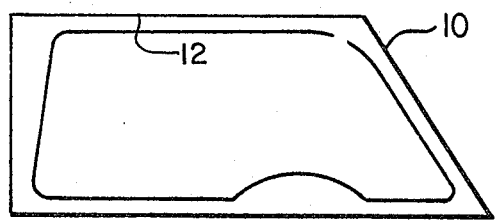
FIG. 1 illustrates a single score line pattern on a single sheet of glass in accordance with prior art procedures.

Reference will now be had to FIGS. 1-3B. FIG. 1 illustrates a glass blank 10 having a score line 12 inscribed thereon. This represents the prior art practice of applying a single score line pattern to a single sheet of glass.

Figure 2A:
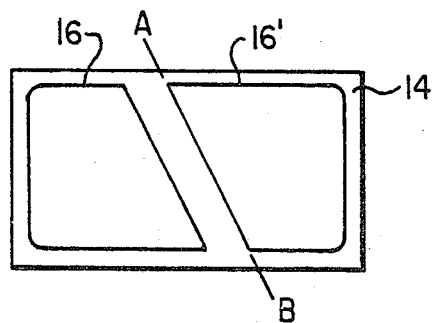
FIGS. 2A and 2B illustrate, respectively, a pair of score line patterns on a single sheet of glass and the splitting apart of the piece of glass along a portion of one of the score lines and the subsequent separation of the two glass parts a distance away from one another in accordance with the present invention.
Figure 2B:
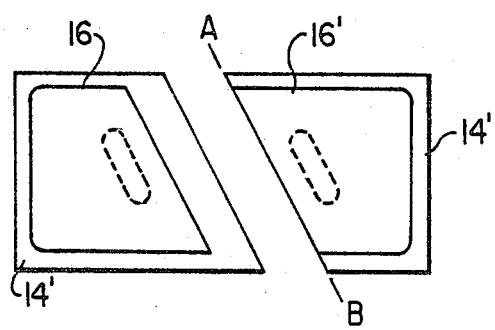

FIG. 2A shows a single piece of glass 14 having a pair of score line patterns 16, 16' inscribed thereon. The two score line patterns each include a respective score line segment, which score line segments extend adjacent to one another. With reference to FIG. 2B it will be seen that the glass has been split into two portions 14', 14' along a line A-B which line corresponds to a segment of one of the score line patterns 16'. Two glass pieces 14', 14' are also shown as being laterally separated from one another. Following this stage, the glass pieces are conveyed to a conventional breakout press where simultaneous breakout of both patterns is effected.

Figure 3A:
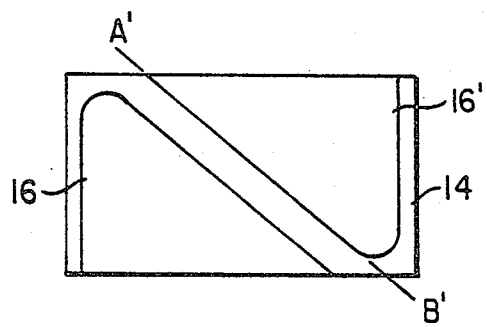
FIGS. 3A and 3B are views similar to FIGS. 2A and 2B wherein different shapes of score line patterns are illustrated.
Figure 3B:
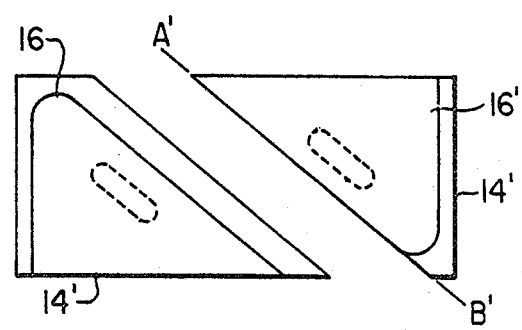

FIGS. 3A and 3B are similar to FIGS. 2A and 2B except that the form of the patterns 16, 16' is different. These two Figures serve to illustrate that the score line patterns formed on the glass sheet need not be of a "closed" configuration.

The method and the apparatus for carrying out the method will be described in detail hereinafter.

Figure 4:
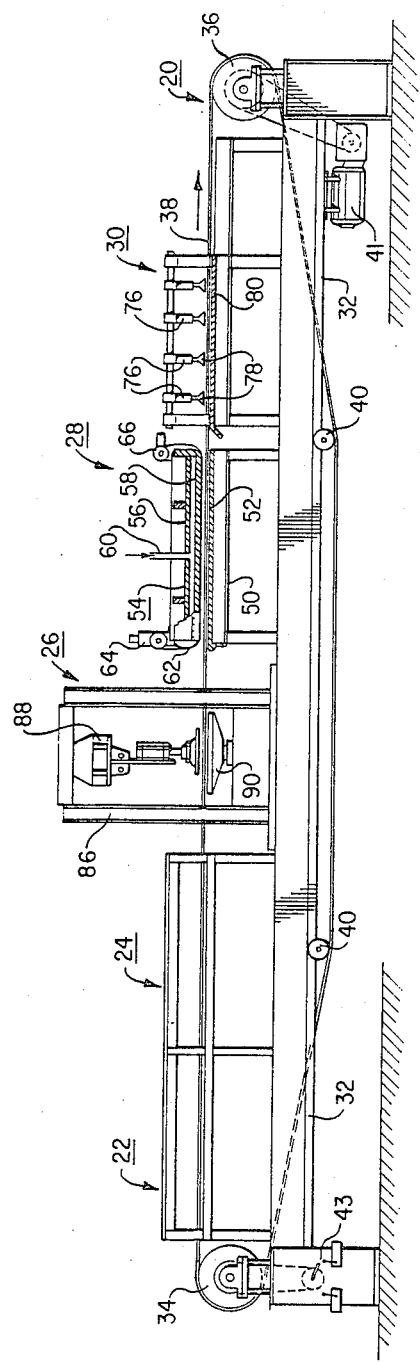
FIG. 4 illustrates a typical conveyor line having glass scoring, splitting and breakout stations disposed therealong.
Figure 5:
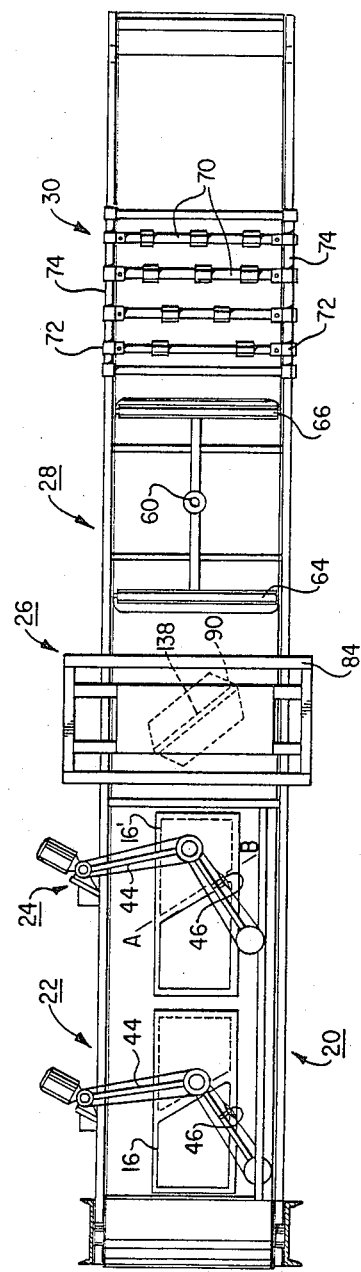
FIG. 5 is a plan view of the conveyor line illustrated in FIG. 4.

FIGS. 4 and 5 are side elevation and plan views respectively of a conveyor line 20 having glass scoring stations 22, 24, a glass splitting station 26, a diaphragm press breakout station 28, and an auxiliary breakout station 30 positioned therealong in serially arranged relation.

The conveyor line 20 includes an elongated main support frame 32 constructed so as to give the assembly the necessary overall strength and stability. Mounted to opposing ends of the conveyor line are conveyor rolls 34 and 36 around both of which passes an endless flexible conveyor belt 38 of a width approximately the same as the length of rolls 34 and 36. The upper run of the conveyor belt 38 is supported on a series of table-like surfaces forming part of the scoring stations 22, 24, the splitter station 26, and the breakout stations 28 and 30. The lower run of conveyor belt 38 is guided by spaced apart guide rollers 40. Drive assembly 41 advances the belt 38 in step-by-step fashion under the control of a cam and limit switch assembly 43.

The apparatus for individually removing glass sheets from a stack and placing same on the conveyor line at the inlet end thereof is not shown, such apparatus being well known in the art as evidenced by U.S. Pat. No. 3,094,322 to Kocher et al issued June 18, 1973.

The apparatus used at scoring stations 22 and 24 to effect scoring of the glass is generally very well known in the art and need not be described in detail here. Basically, each scoring device comprises an articulated arm assembly 44 which carries a scoring head 46 thereon. This articulated arm is caused to travel in a closed path by virtue of a fixed cam (not shown) having the same outline shape as the outline shape of the score line to be placed on the glass sheet. The scoring head 46 will include a suitable cutting element, the latter being capable of being withdrawn into the scoring head by suitable pneumatic control means or the like (not shown). The scoring stations 22 and 24 will thus be seen to be identical and in the usual case the outline shapes of their respective scoring head guide cams will be the same although this is not necessarily the case. The mechanisms at scoring stations 22 and 24 are of course controlled by suitable limit switches, relays etc., which are not shown here since they form a part of the prior art as evidenced by U.S. Pat. No. 3,537,345 issued Nov. 30, 1970 to A. Luppino.

The splitter station 26 is interposed in the conveyor line between the second scoring station 24 and the first breakout station 28. Splitter station 26 will be described in greater detail hereinafter with reference to FIGS. 6–12.

The first breakout press is illustrated as being a diaphragm press (the same being shown partly in section in FIG. 4) and is of a conventional construction. Since diaphragm presses are extremely well known in the art and have been used extensively in the glass fabrication industry for many years, a detailed description of same is considered unnecessary. The diaphragm press includes a table 50 over which the conveyor belt 38 travels, the upper surface of the table being covered with a relatively thick rubber mat 52. A press assembly 54 overlies table 50 in spaced parallel relation thereto. The press assembly 54 includes a rigid reinforced plate 56 below which is positioned a flexible rubber diaphragm 58, the marginal edges of which are securely attached to the periphery of press assembly 54 in air tight relation therewith. An inlet 60 for pressurized air is disposed in a central portion of press assembly 54 thereby to admit pressurized air into a space provided between the diaphragm 58 and the rigid plate 56. Thus, when pressurized air is applied, the diaphragm 58 is forced downwardly into pressurized engagement with a glass sheet lying on the conveyor belt 38. Because of the presence of the thick rubber pad 52 underlying the conveyor belt, moments of force are applied to the glass sheet along any score lines positioned thereon with the result being that the glass tends to break along such score lines. As noted previously, this form of press works well in cases where only a single pattern is disposed on the glass blank in which event the diaphragm press has, in effect a free marginal edge to act on thereby enabling it to create the necessary bending moments to break the glass along the score line. However, this form of press does not work well when one attempts to break out a pair of score line patterns on a single glass sheet since the adjacent score line segments in the central portions of the glass sheet do not tend to split along such lines. As will be seen in more detail hereinafter, by providing the splitter assembly 26, this problem is substantially eliminated. In order to eliminate unnecessary wear on the diaphragm 58, a protective cover of woven fiberglass or the like is interposed between diaphragm 58 and the upper surface of the glass sheet. This protective cover is designated by reference 62 and supply and takeup rolls 64, 66 may be provided adjacent opposite ends of the press assembly thereby to permit a fresh length of cover to be unwound from the supply roll with the worn cover being taken up on the takeup roll thus effectively allowing replacement of a worn cover without dismantling the apparatus.

The auxiliary breakout press 30 is only used in the event that the diaphragm press 28 alone is incapable of effecting breakout of certain relatively complex score line patterns. For example, if the score line pattern includes therein relatively sharp corners and relatively tight curves, auxiliary breakout press 30 may be put into operation. This form of breakout press is also conveniently of a type which is well known in the art and thus a full and detailed description of same is not required. Breakout press 30 includes a plurality of support tubes 70 which extend transversely of the conveyor line at a position spaced above the conveyor belt. The opposing ends of these tubes are connected via adjustment brackets 72 to main support tubes 74 which are disposed in parallel relation to the longitudinal axis of the conveyor line. Each support tube 70 carries a small pneumatic cylinder 76 with each of the latter carrying a downwardly depending presser foot 78 adapted to come into engagement with the surface of a glass sheet. These pneumatic cylinders 76 may be adjusted to any desired positions along the tubes 70 to which they are mounted. In practice, these pneumatic cylinders are adjusted so that the respective presser feet 78 can contact the glass sheet just outside of the score line patterns applied thereon at scoring stations 22, 24. The precise locations of pneumatic cylinders 76 depends upon the shape of the particular score line patterns of course, and the positioning of same for most effective results is determined on the basis of experience by those skilled in the art. In operation, suitable control devices (not shown) apply air pressure to pneumatic cylinders 76 in a predetermined sequence thereby to cause their associated presser feet 78 to engage the margins of the glass thus applying bending moments to same and effecting severing of the glass parts all along the respective score lines thereon. This severing action is enhanced by virtue of the presence of a relatively thick rubber pad 80 underlying the conveyor belt 38 which rubber pad deforms under the influence of the pressure applied by the pressure feet 78. To further enhance the severing action, the support table over which the relatively thick rubber pad 80 overlies may be made such that the surface of the latter has a slightly convex configuration when seen in a section view taken transverse to the longitudinal axis of the conveyor line.

The splitter station 26 will now be described with particular reference to FIGS. 5A, 6-12.

The splitter station includes a splitter frame 86 from which is suspended a splitter head assembly 88. Positioned below the splitter head 88 is a splitter table 90. With reference to FIG. 5A it will be seen that the positions of the splitter frame 86 and the splitter table 90 may be adjusted thereby to accommodate different types and sizes of score line patterns formed on the glass sheet. Splitter table 90 may be angularly adjusted about a vertical axis; that is, the angular position of the splitter table about a vertical axis may be varied relative to the longitudinal axis of the conveyor line as illustrated by arrowed line A. The splitter frame 86 may also be adjusted transversely of the longitudinal direction of the conveyor line as illustrated by arrow B and furthermore the splitter frame may also be adjusted longitudinally of the conveyor line as indicated by arrow C.

The various supports for the splitter frame 86 and the splitter table 90 are illustrated in FIGS. 6 and 7. With reference to FIG. 7 it will be seen that the splitter frame 86 is mounted to spaced frame members 92. Frame members 92, in turn, are mounted via pillow blocks 94 to transversely spaced apart support rods 96 which extend parallel to the longitudinal axis of the conveyor line and which are mounted via support blocks 98 to the main frame 32 of the conveyor line. By virtue of this arrangement splitter frame 86 can be adjusted longitudinally of the conveyor line by shifting the same along the longitudinally extending support rods 96 and thereafter securing the pillow blocks 94 thereto by means of suitable set screws disposed in adjustment collars 100.

In order to provide for adjustment of the splitter frame 86 transversely of the conveyor line, the lower end of splitter frame 86 is provided with transversely extending support rods 102 connected to the support frame 86 via respective spaced apart pairs of shaft support blocks 104. The transversely extending support rods 102 are connected to the frame members 92 via respective spaced apart pairs of pillow blocks 106. Thus the splitter frame 86 may be adjusted transversely of the conveyor line with the support rods 102 sliding through the pillow blocks 106 and thereafter being locked in position by means of the set screw and collar assemblies 108.

In order to permit adjustment of splitter table 90 about a vertical axis, the table 90 is rigidly mounted to a vertical spindle 110, the latter passing through and being journalled in a bearing support block 112. The bearing support block 112 is, in turn, supported via a plurality of pillow blocks disposed on a further group of transversely extending support rods 116, the opposing ends of the latter being, in turn, mounted in shaft support blocks 118. This arrangement allows the above-noted transverse adjustment of the splitter frame 86 to be effected without necessarily affecting the transverse location of the splitter table 90 relative to the conveyor line.

In order to effect the desired angular adjustment of splitter table 90 about the vertical axis, the lower end of spindle 110 is provided with a sprocket 120 which is connected via roller chain 122 to a relatively small diameter sprocket 124 mounted on the lower end of hand wheel shaft 126. This hand wheel shaft is journalled in a support assembly 128 which is rigidly secured to and extends outwardly of splitter frame 86 proper. The upper end of hand wheel shaft 126 is rigidly connected to hand wheel 130, the latter being provided with suitable engraving around the circumference thereof and being associated with a suitable pointer thereby to allow the operator to accurately position hand wheel 130 and hence splitter table 90 in the desired angular relationship to the longitudinal axis of the conveyor line.

Figure 8:
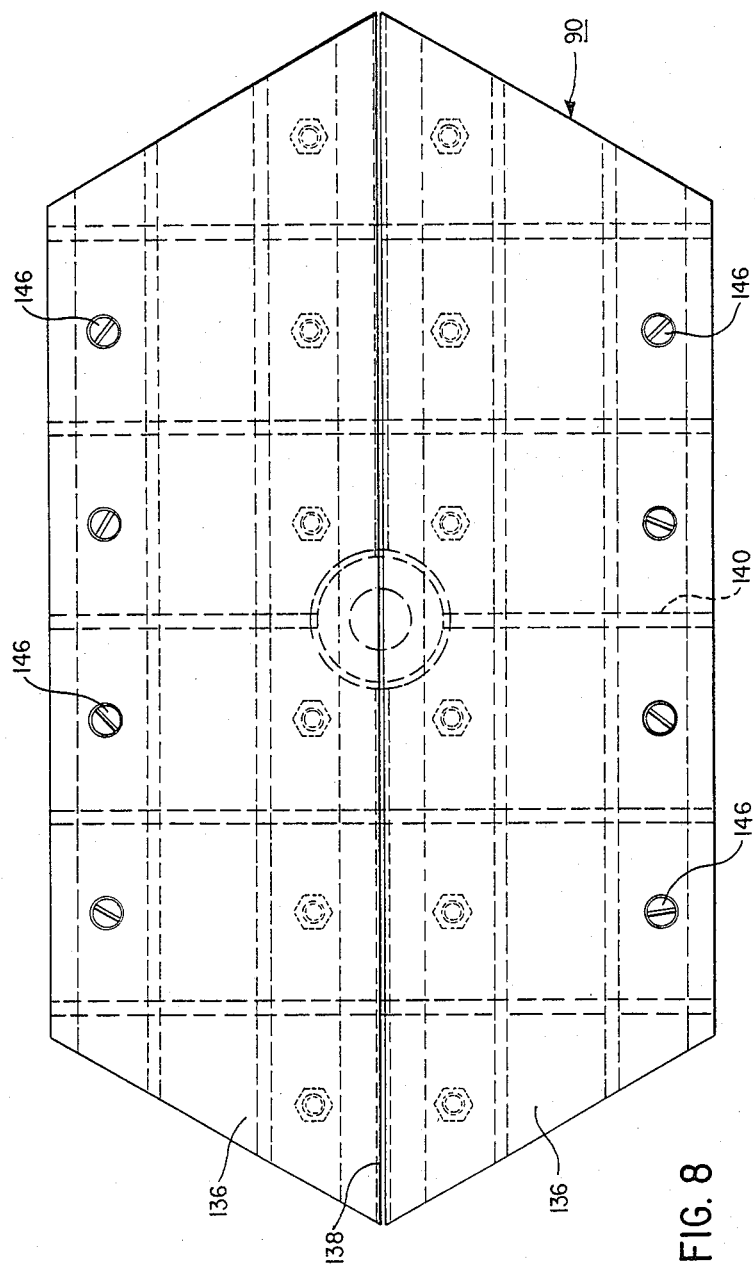
FIGS. 8 and 9 are plan and end elevation views respectively of the splitter table.
Figure 9:
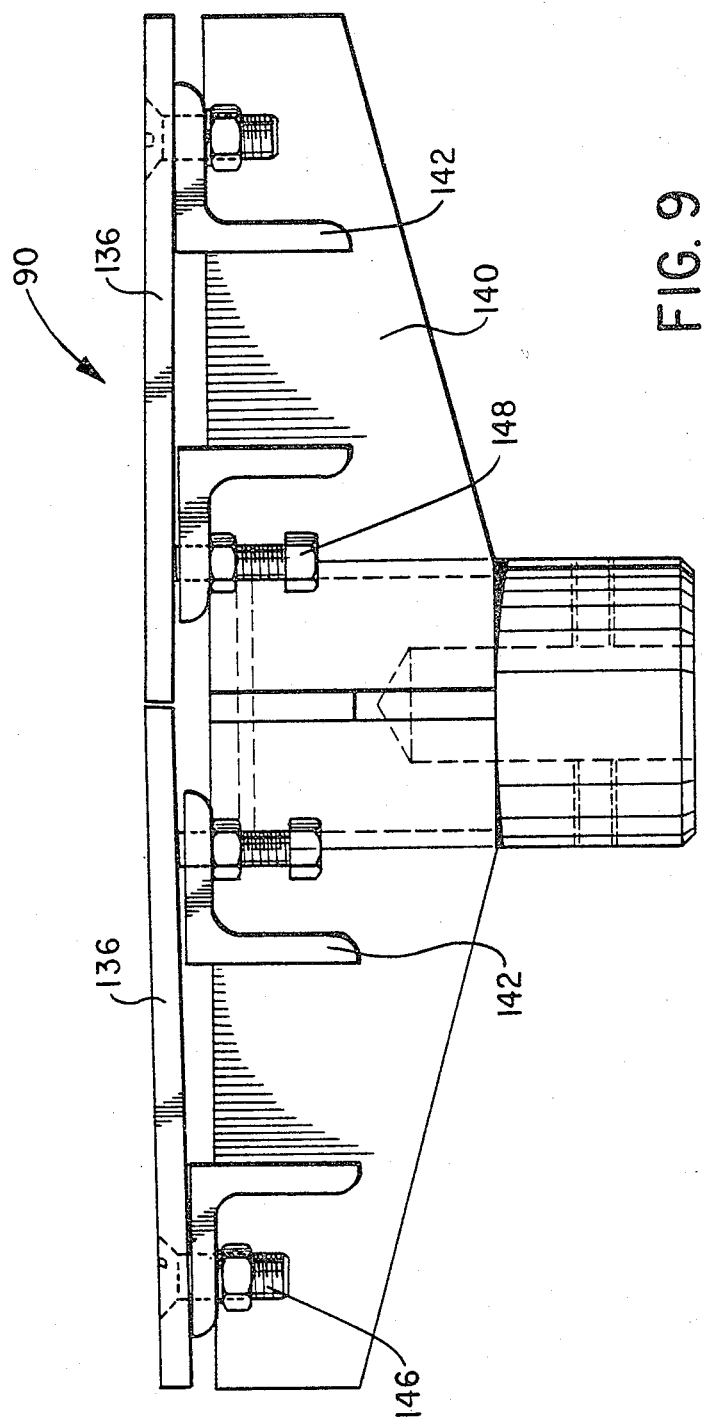

The splitter table per se is shown in detail in FIGS. 8 and 9. The upper surface of splitter table 90 consists of a pair of plates 136 which meet with each other along a ridge line or peak 138 which line coincides with the longitudinal axis of symmetry of the table. The table is of a sturdy welded construction thereby to withstand the stresses encountered during use and includes a plurality of transversely extending gusset plates 140 having securely welded thereto a series of longitudinally extending spaced apart angle members 142. The outboard edge portions of plates 136 are fastened to the underlying closely adjacent angle members 142 by means of threaded fasteners 146 while the inboard edge portions of the respective plates 136 adjacent the ridge line 138 are supported on longitudinally spaced apart adjustment screws 148, the latter being threaded through associated angle members 142. By rotating adjustment screws 148 the inboard edges of the two plates 132 can be elevated to a position above the outboard edges of the plates thereby to provide the above-noted peak or ridge line 138. In a typical operation, screws 148 are adjusted such that the ridge line 138 lies in a plane which is approximately 1/16th of an inch above the plane defined by the longitudinally extending outboard edges of plates 136.

It will be appreciated by those skilled in the art that the score line segment extending along line A-B (FIG. 2B) should not deviate too far from a straight line since the ridge line 138 is of course straight. The maximum amount of curvature permissible in the score line portion referred to can be determined by way of a few simple experiments.

In a modified version (not shown) of the splitter table, means are provided to permit rapid adjustment of the height of the peak defined by ridge line 138. (Thin flexible glass requires a higher peak than thick rigid glass). In this version a rotatable cam shaft having axially spaced cams therealong is disposed below plates 136. The plates 136 are hinged together along the ridge line 138 and hinged to the underlying angle members along one outboard edge. By rotating the cam shaft with a suitable crank, the position of the ridge line 138 can be raised or lowered to suit the thickness of the glass being processed.

Figure 10:
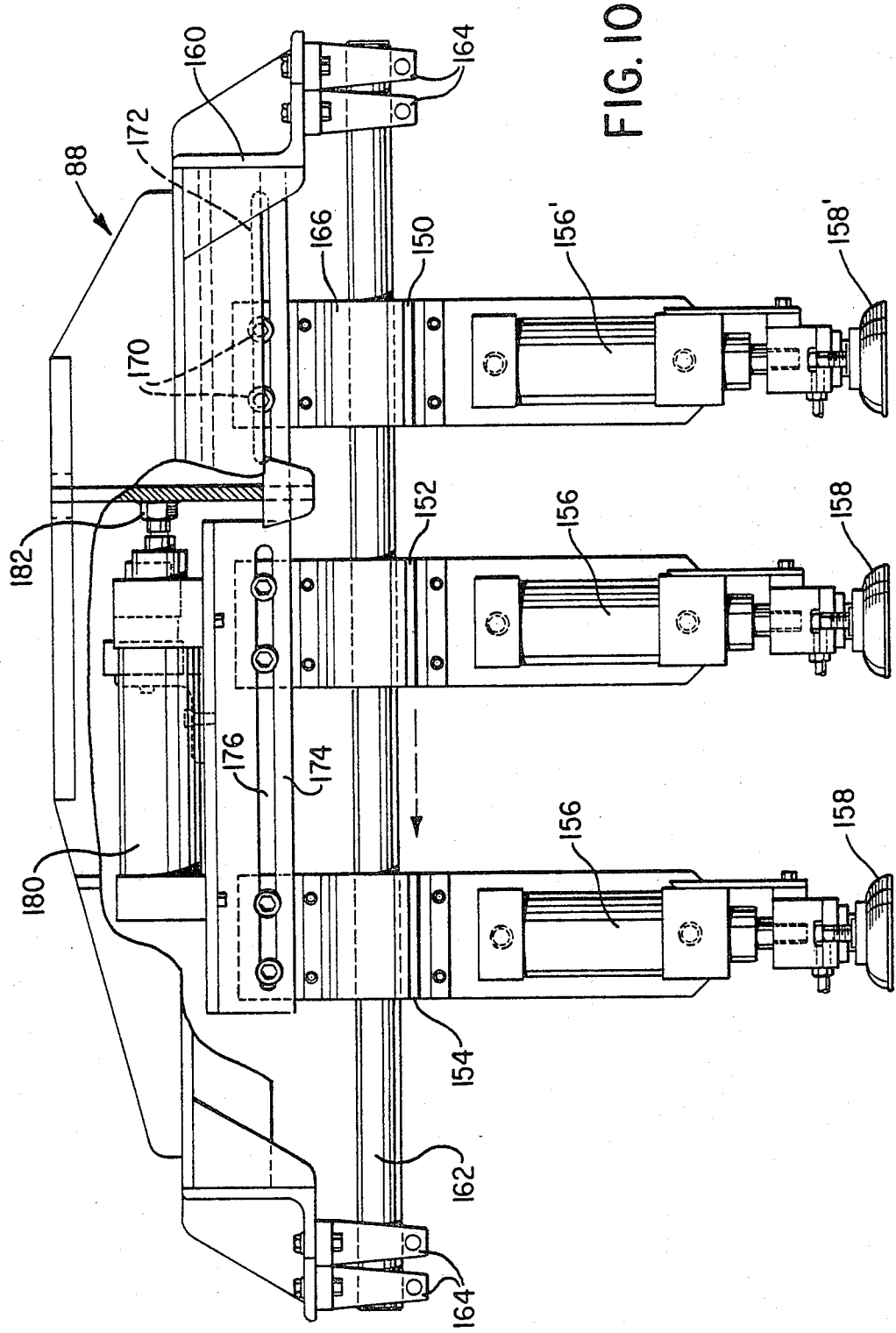
FIGS. 10 and 11 are elevation views of the splitter head assembly taken at right angles to one another.
Figure 11:
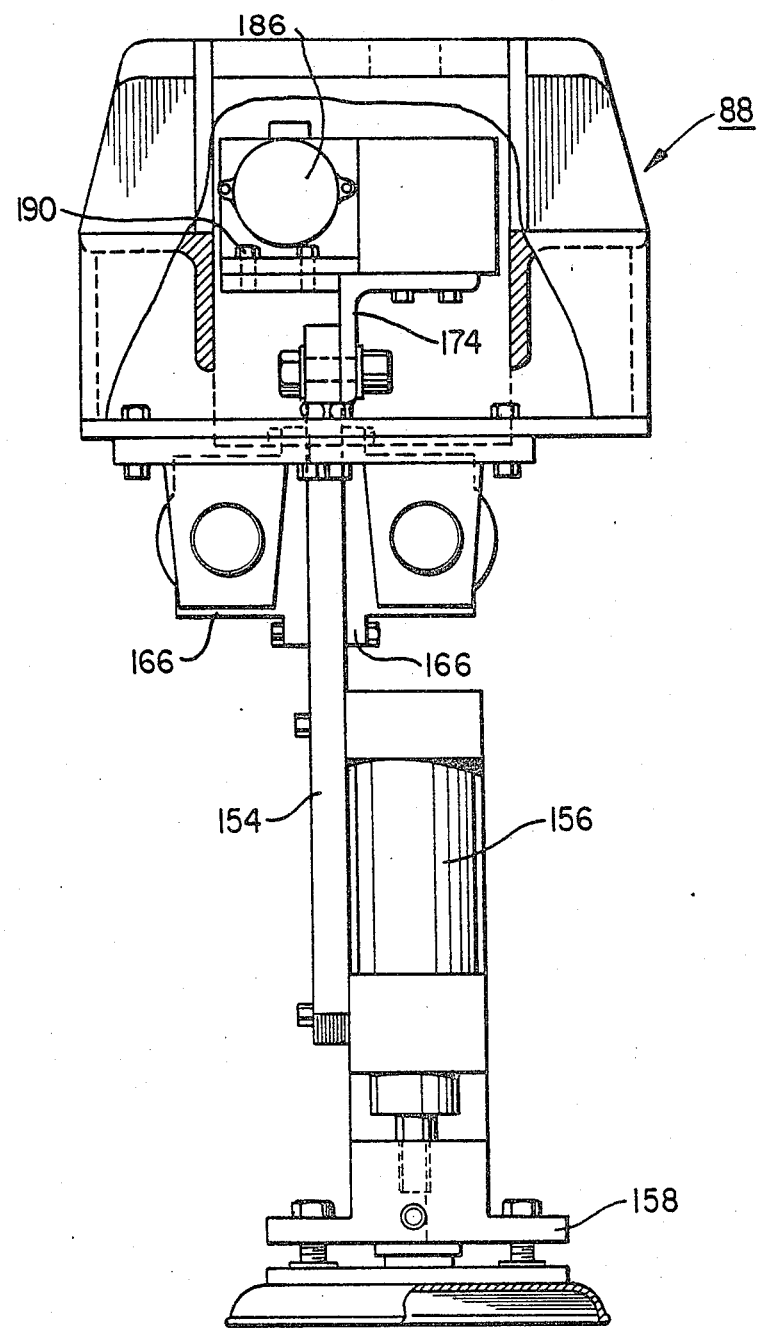
Figure 12:
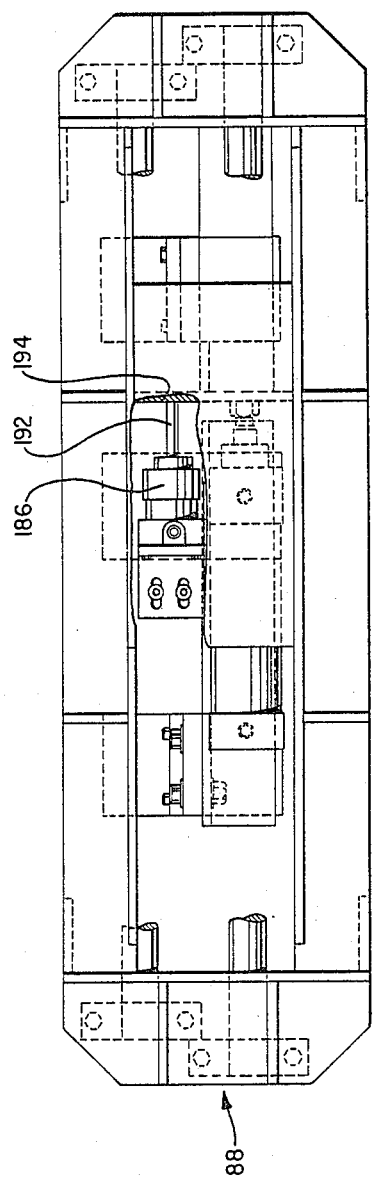
FIG. 12 is a plan view of the splitter head assembly.

The splitter head assembly is illustrated generally in FIGS. 6 and 7 and is shown in further detail in FIGS. 10-12. The latter three FIGS. employ cut away portions thereby to show the interior structures.

As previously noted, the splitter head 88 is located above the splitter table 90 in spaced relation thereto. As seen in FIG. 6 the splitter head includes three transversely spaced support brackets 150, 152 and 154 which project downwardly toward splitter table 90. Each of these brackets carries a respective air cylinder 156, 156' each cylinder having a respective plunger thereon to the lower end of which are connected respective vacuum pad assemblies 158, 158'.

The splitter head assembly 88 includes a housing assembly 160 to the lower portion of which is attached a pair of spaced parallel guide rods 162 the latter being connected to housing 160 via associated pairs of support blocks 164. Each of the support brackets 150-154 is mounted to the guide rods 162 via associated pairs of pillow block assemblies 166. With particular reference to FIG. 10 it will be seen that the upper end of support bracket 150 is secured to a portion of housing 160 via bolts 170, with the slot 172 permitting a certain degree of adjustment of bracket 150 along guide rods 162. During operation of the apparatus, however, the support bracket 150 remains in a fixed position. On the other hand, the upper ends of brackets 152, 154 are connected to a common angle member 174 for movement therewith as a unit. It will be noted that elongated slot 176 in angle member 174 permits brackets 154 and 152 to be adjusted toward or away from one another. The angle member 174 has mounted thereon a pneumatic cylinder 180 the latter having its ram 182 connected to a fixed portion of housing 160. Thus when cylinder 180 is actuated, the angle member 174 is caused to move parallel to guide rods 162 with support brackets 152, 154 and their associated pneumatic cylinders and vacuum pads 156, 158 respectively being shifted laterally relative to the remaining fixed bracket 150 and its associated cylinder 156' and vacuum pad 158'. It will be seen hereinafter that this motion is utilized to separate the two glass parts from one another after the initial splitting of the piece of glass into two parts has taken place. The pneumatic cylinder 180 is so arranged as to provide for a lateral movement generally somewhat greater than two inches and preferably about three inches or more.

In order to effect an initial small amount of separation between the two glass parts after the splitting operation is effected, the splitter head assembly 88 includes, as best seen in FIG. 12, an adjustable stroke actuator 186 which is connected via bracket means 190 to the above-noted angle member 174. The plunger 192 of this adjustable stroke actuator presses against a fixed portion 194 of the housing 160 thereby to effect initial separation of the glass parts by a very small amount, e.g. 1/16". This actuator 186 may, for example, be a "Mead" adjustable stroke air clamp.

With reference now to the operation of the above described apparatus, the conveyor belt 38 is advanced in step-by-step fashion via the drive assembly 41. A cam and limit switch assembly 43 driven by the conveyor line controls the drive 41 such that the latter moves the belt in steps of equal length, e.g. about 40 inches.

Prior to commencing operation the splitter frame 86 is adjusted as required both longitudinally and transversely of the longitudinal axis of the conveyor line thereby to accommodate the patterns which are to be scored on the glass sheet. The splitter table 90 is also adjusted about the vertical axis thereby to allow the ridge line 138 thereon to be brought into alignment with the relevant portion of one of the score line segments. The sheet of glass is positioned on the conveyor belt 38 and conveyed to a predetermined location in the first scoring station 22 following which score line pattern 16 is applied to the sheet of glass. On completion of this operation the conveyor belt is advanced one increment thereby to bring the sheet of glass into the second scoring station 24 where the second score line pattern 16' is applied to the glass sheet. The conveyor belt is then advanced a further increment thereby to bring the sheet of glass into the splitter station 26 with that segment of one of the score line patterns as represented by the line A-B being brought into substantial registry with the ridge line 138 of the splitter table 90. At this point of the operation, the vacuum pads 158, 158 are positioned to one side of line A-B while the other vacuum pad 158' is located to the other side of such line. The air cylinders 156, 156' are then all simultaneously actuated thereby to cause their associated vacuum pads to descend downwardly onto the upper surface of the glass thereby to apply forces to the glass on opposite sides of the ridge line 138 thus creating bending moments of force in the glass about the segment of the score line represented by line A-B thus causing the glass sheet to be split into two parts each having a respective one of the score line patterns thereon.

Following the above operation, a vacuum is applied to the two vacuum pads 158 via the small air pipes 159 associated therewith. This causes the glass part with which such feet are in contact to adhere thereto. Following this, the actuator 186 operates so that its ram is extended by a very small amount as described above thus causing the angle member 174 to which it is connected to be shifted laterally with the two vacuum pads 158 thus being caused to move away from the other vacuum pad 158' by a very small distance thus separating the glass parts slightly from one another (e.g. 1/16"). Following this operation, the two pneumatic cylinders 156 are actuated in the reverse direction thereby to cause their associated rams and vacuum pad 158 to lift upwardly away from the conveyor belt thus lifting the glass part associated therewith clear of the conveyor belt. (Vacuum pad 158' is also lifted at this time but since no vacuum was applied thereto, the glass part which contacted it remains resting on the conveyor belt.) Following this operation, the pneumatic cylinder 180 is actuated thus causing the air cylinders 156 and their associated support brackets 152, 154 to be shifted along the guide rods 162 for a distance of, e.g. three inches, following which the vacuum to vacuum pads 158 is cut off thus allowing the glass part to drop a short distance onto the conveyor belt. The pneumatic cylinder 180 is then actuated thereby to bring the air cylinders 156 and their associated vacuum pads 158 back to their initial position above the conveyor belt. The conveyor belt is then advanced a further increment thereby bringing the two glass parts which have now been separated a selected distance away from one another into the diaphragm breakout press 28. Air pressure is applied via inlet 60 thus causing the diaphragm 58 to press downwardly against the two glass parts thus causing the two glass parts to break along their respective score line patterns. Because of the fact that the two glass parts have been separated from one another the diaphragm press is able to set up the necessary bending moments about the score lines thus permitting, in most cases, severing of the glass parts all along their respective score lines. However, in the case of complex patterns involving sharp corners, a further breakout operation may be necessary in which event the glass parts are conveyed into the auxiliary breakout station 30 following which the operation described previously is carried out thereby to complete the breakout procedure. Following this operation, the conveyor belt moves the broken out patterns to a further station, not shown, and the glass blanks of predetermined outline contour are lifted clear of the conveyor belt and transported to a further processing station with the waste glass thence being transported via the conveyor belt to a disposal station just beyond the end of the conveyor line for processing and re-cycling in the usual manner.

The electrical control circuitry for actuating the several pneumatic cylinders and controlling the air valves for the vacuum feet may be of any suitable conventional design and those skilled in the art will be readily able to devise a suitable form of control system for programming the several operations of the splitter.

Although a specific embodiment of the invention has been described, those skilled in the art will realize that various modifications can be made to the arrangement disclosed without departing from the spirit and scope of the invention as hereinafter claimed.

What is claimed is:

1. The method of scoring and breaking out glass blanks of predetermined outline shape from a glass sheet comprising:

(a) applying first and second score line patterns to a piece of glass, the first and second score line patterns each including a respective score line segment, which score line segments extend adjacent to one another, said score line patterns defining, at least in part, the outlines of glass blanks to be subsequently broken out from the piece of glass;

(b) applying forces to the piece of glass in such a way as to sever the glass along one of the score line segments and to split the piece of glass into two parts each having a respective one of said patterns thereon;

(c) laterally separating the two glass parts a selected distance away from one another; and (d) applying break-out forces to the laterally separated glass parts to complete the severing of the parts along their respective score line patterns.

2. The method of claim 1 wherein step (b) includes the step of positioning the glass over a table having a raised ridge, with said one score line segment being aligned with said ridge, and said forces being applied to the glass on opposite sides of the ridge to create bending moments of force in the glass about said score line segment to effect the severing of the glass therealong.

3. The method of claim 2 wherein step (c) includes lifting one of the glass parts clear of a surface on which it was resting, then shifting said one glass part laterally relative to the other and then depositing the glass part on said surface whereby to avoid scuffing of the glass part on said surface.

4. The method of claim 3 wherein step (c) further includes the step of initially separating the glass parts by a minor amount while they are still resting on said surface prior to the lifting step so as to prevent edge damage to the glass parts during the lifting step.

5. The method of claim 3 or 4 wherein said forces are applied to the glass by means of vacuum pads which are initially moved downwardly into forcible engagement with the glass to effect the splitting thereof, one of the vacuum pads engaging a portion of said one glass part to enable the same to be lifted clear of said surface.

6. The method of claim 1, 2 or 3 wherein the selected distance recited in step (c) is not less than about 2 inches.

7. The method of claim 1, 2 or 3 wherein step (d) is effected by means of a diaphragm press, the latter applying said break-out forces to substantially the entire major surfaces of the two glass parts.

8. The method of claim 1, 2 or 3 wherein the break-out forces of step (d) are applied simultaneously to both glass parts.

9. The method of claim 1, 2 or 3 wherein the glass is supported on an endless conveyor belt which carries the glass in step-by-step fashion through a scoring station where step (a) is effected, through a splitting station where steps (b) and (c) are effected, and through at least one breakout station where step (d) is effected.

10. Apparatus for scoring and breaking out glass blanks of predetermined outline shape from a glass sheet comprising:
 (a) means for applying first and second score line patterns to a piece of glass, in such a manner that the first and second score line patterns each include a respective score line segment, which score line segments extend adjacent to one another, said score line patterns defining, at least in part, the outlines of glass blanks to be subsequently broken out from the piece of glass;
 (b) means for applying forces to the piece of glass in such a way as to sever the glass along one of the score line segments and to split the piece of glass into two parts each having a respective one of said patterns thereon;
 (c) means for laterally separating the two glass parts a selected distance away from one another; and
 (d) means for applying break-out pressures to the laterally separated glass parts to complete the severing of the parts along their respective score line patterns.

11. The apparatus of claim 10 wherein means (b) include a table having a raised ridge over which said piece of glass is positioned, said table being adjustable so that said score line segment can be aligned with said ridge, and said force applying means including means for contacting the glass on opposite sides of the ridge to create bending moments of force in the glass about said score line segment to effect the severing of the glass therealong.

12. The apparatus of claim 11 wherein the glass contacting means is associated with means for lifting one of the glass parts clear of a surface on which it was resting, then shifting said one glass part laterally relative to the other and then depositing the glass part on said surface in separated relation to one another whereby to avoid scuffing of the glass part on said surface.

13. The apparatus of claim 12 further including means for initially separating the glass parts by a minor amount while they are still resting on said surface prior to one being lifted clear of said surface so as to prevent edge damage to the glass during the lifting step.

14. The apparatus of claim 12 or 13 wherein said glass contacting means comprise vacuum pads which are initially moved downwardly by the force applying means into forcible engagement with the glass to effect the splitting thereof, one of the vacuum pads engaging a portion of said one glass part to enable the same to be lifted clear of said surface.

15. The apparatus of claim 11, 12 or 13 wherein the table is angularly adjustable about a vertical axis to facilitate the alignment of the raised ridge thereon with said segment of the score line in the glass.

16. The apparatus of claim 11, 12 or 13 wherein means (d) is a diaphragm press capable of applying said break-out forces to substantially the entire major surfaces of the two glass parts.

17. The apparatus of claim 11, 12 or 13 wherein the means for applying the score line patterns define a scoring station, wherein the means for applying forces to the glass and the means for separating the glass parts define a splitting station, and wherein the means for applying the break-out pressures define a break-out station, and an endless conveyor belt and motor means for moving the glass in step-by-step fashion through the above recited stations.

* * * * *

UNITED STATES PATENT AND TRADEMARK OFFICE
CERTIFICATE OF CORRECTION

PATENT NO. : 4,278,193

DATED : July 14, 1981

INVENTOR(S) : Gordon F. Pereman et al

It is certified that error appears in the above—identified patent and that said Letters Patent are hereby corrected as shown below:

Column 12, Claim 13, line 5, --parts-- should be inserted after the word "glass".

Signed and Sealed this

Eighth Day of December 1981

[SEAL]

Attest:

Attesting Officer

GERALD J. MOSSINGHOFF

Commissioner of Patents and Trademarks